Nov. 6, 1945.   W. A. RINGLER ET AL   2,388,288
JOINDERS IN SHEET MATERIALS
Filed Sept. 16, 1942   4 Sheets-Sheet 2
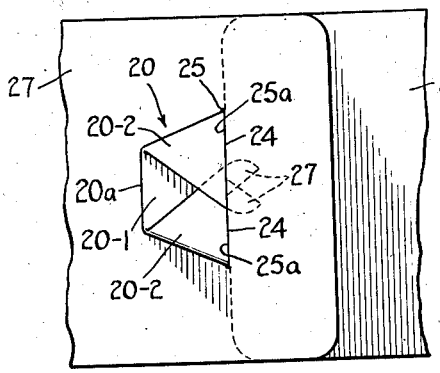
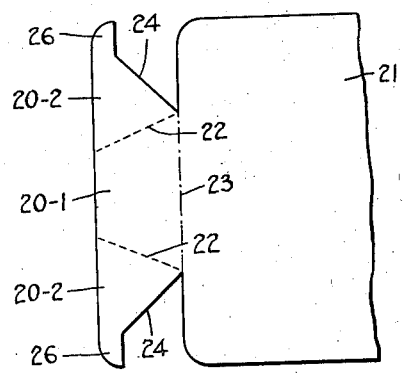
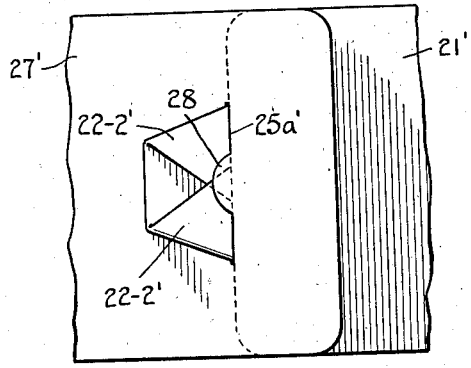
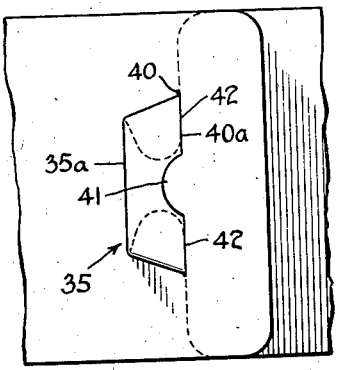
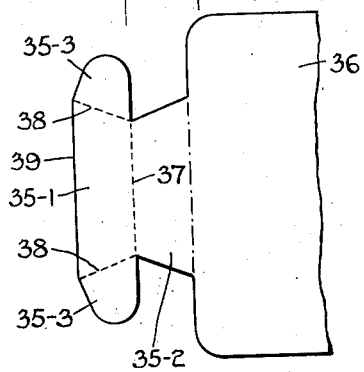
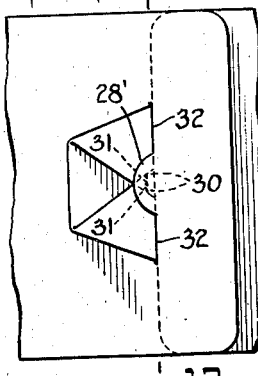
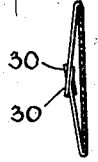
INVENTORS
WILLIAM A. RINGLER
MARSHALL I. WILLIAMSON
BY
THEIR ATTORNEY Nov. 6, 1945.   W. A. RINGLER ET AL   2,388,288
JOINDERS IN SHEET MATERIALS
Filed Sept. 16, 1942   4 Sheets-Sheet 3
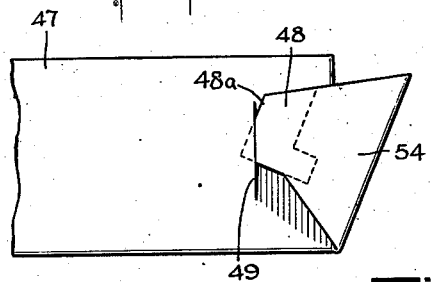
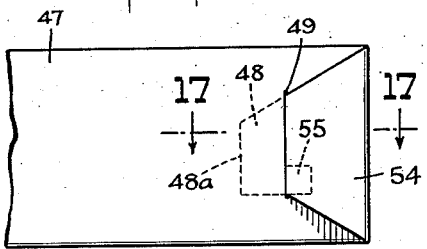
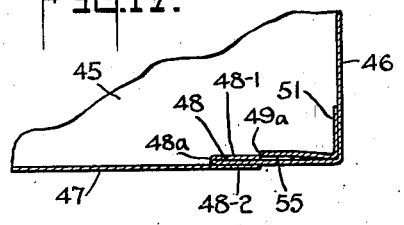
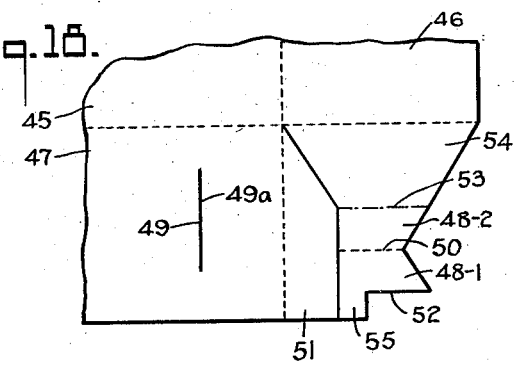
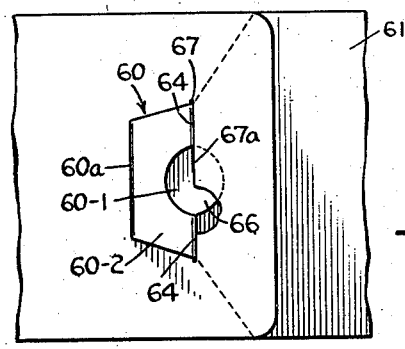
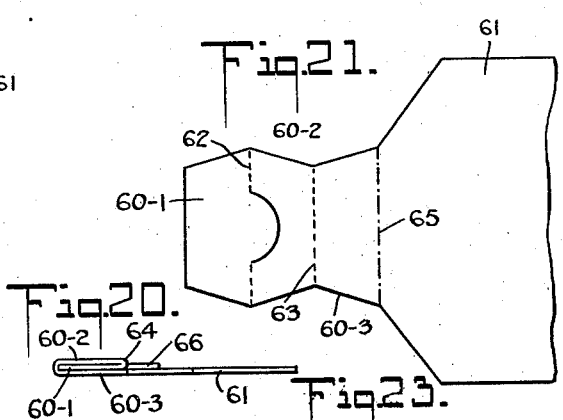
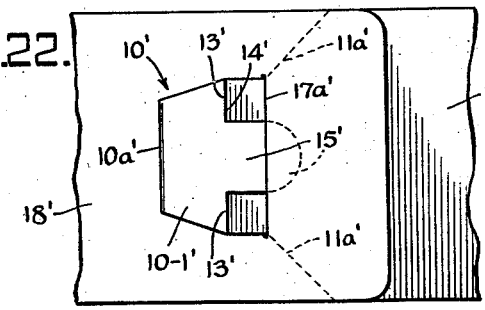
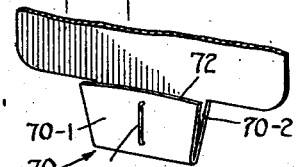
INVENTOR
WILLIAM A. RINGLER
MARSHALL I. WILLIAMSON
BY
ATTORNEY

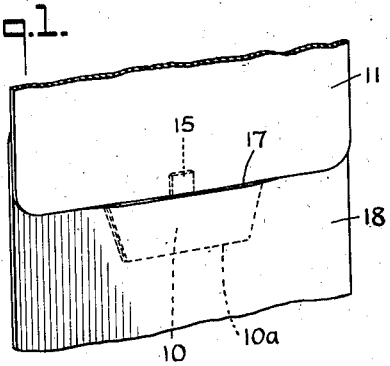
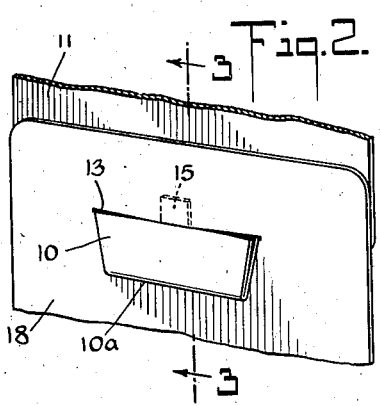
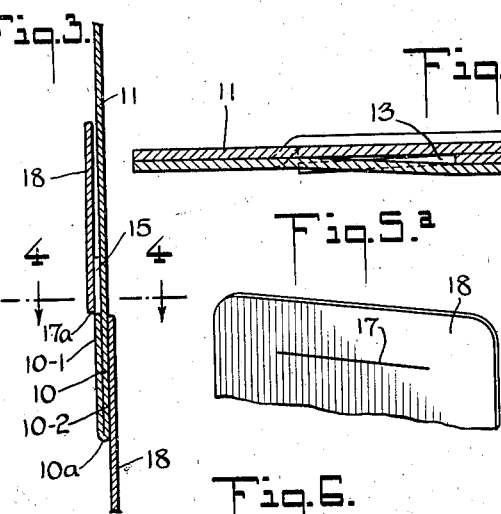
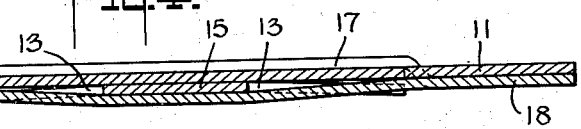
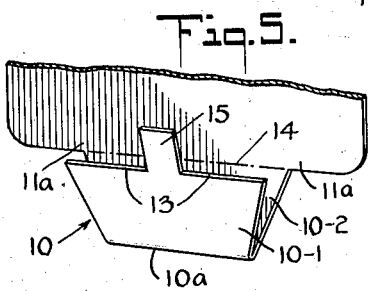
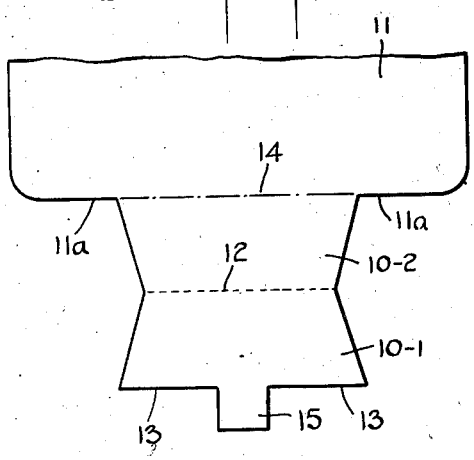
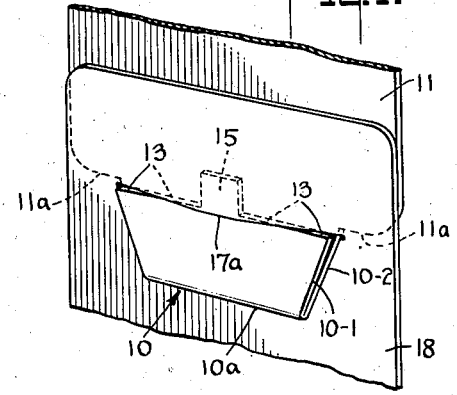

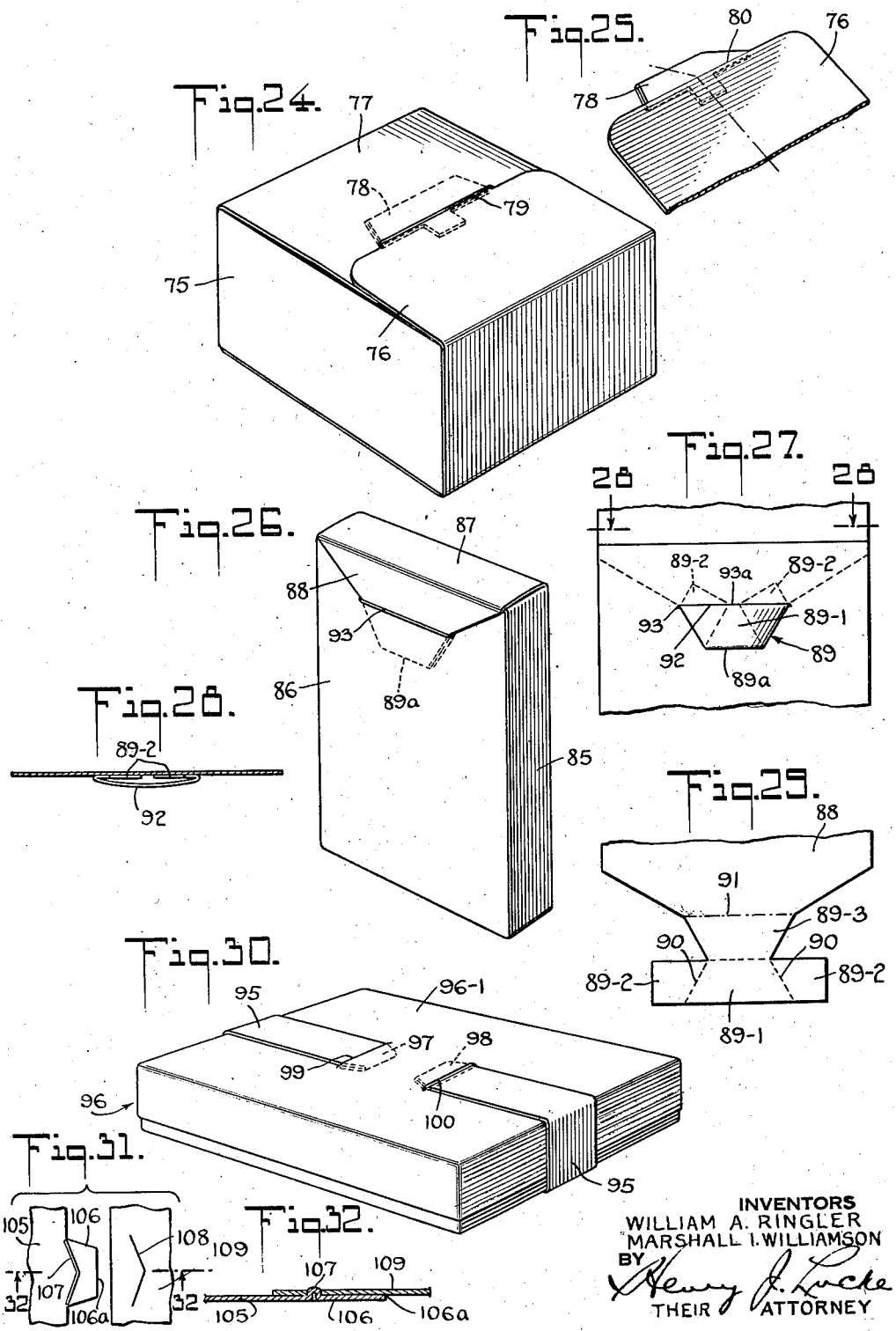

Patented Nov. 6, 1945

2,388,288

UNITED STATES PATENT OFFICE 2,388,288

JOINDERS IN SHEET MATERIALS

William A. Ringler, Wayne, Pa., and Marshall I. Williamson, New York, N. Y., assignors to Wedglok Corporation, New York, N. Y., a corporation of New York Application September 16, 1942, Serial No. 458,498

4 Claims. (Cl. 229—35)

This invention relates to joinders in sheet materials wherein the component elements of the joinders are formed of portions of those sheet materials which are joined, and relates particularly to joinders of a type having tongue and slit or equivalent interengaging or interlocking elements, one of which elements includes a tab.

The invention is applicable, in its broadest sense, to all relatively stiff sheet materials capable of resisting deformation sufficiently to bear the stress and strains to which the joinders are likely to be subjected during use. The sheet materials in which the slit or equivalent elements are formed must, however, be sufficiently flexible to allow such slit elements to flex open for receiving the tongue elements, and must, also, be sufficiently resilient to tend to return to substantially closed position about the tongue elements, to bow the effective edge of the slit or equivalent, to cause such shoulder to engage with such effective edge, thus locking the tongue with respect to such effective edge. In the more preferred embodiments of the invention, the sheet materials from which the tongue elements are formed will be sufficiently flexible to permit folding thereof in the formation of such tongue elements, and will, also, possess sufficient resiliency to tend to return to normal position after being folded, the advantages of which will appear hereinafter. A sheet material to which the invention is especially applicable is ordinary paper-board material, as extensively used in the folding box industry. Accordingly, embodiments of the invention are well suited for use in such industry.

A principal object of the invention is to provide a joinder of the type described which will be very simple and inexpensive to produce, wherein the component elements thereof will interengage and interlock very easily and without damage to the sheet materials being joined, which will be tight and snug, and which will strongly resist inadvertent or unauthorized unlocking.

In the accomplishment of the above object, the tongue element of each embodiment is provided with a shoulder member extending transversely across one of its faces, preferably in substantial coincidence with its base line and in substantial conformity with the defining i. e. effective edge of the tongue-receiving slit or equivalent, whereby, upon direct insertion of the tongue element in the slit or equivalent to such an extent that the shoulder member "clicks" into abutting engagement with that defining edge of the slit or equivalent which lies farthest from the tip of the tongue element, such tongue and slit or equivalent elements will be tightly interlocked.

In those instances where the shoulder member of the tongue element is formed by folding the sheet material upon itself, such tab or equivalent means for maintaining such defining edge of the slit in bowed condition conveniently functions, also, to maintain the folded parts of such sheet material in folded position.

Further objects and features of the invention will be apparent from the following detailed description of the several specific embodiments illustrated in the accompanying drawings.

In the drawings:

Fig. 1 represents a perspective view of a preferred form of joinder according to the invention, the view being directed toward that one of the opposite flat faces thereof which is ordinarily the exposed or finished face; dotted lines reveal that the shoulder member is here formed by the folding of the sheet material of the tongue element upon itself, and that a tab member provides the means for maintaining the slit in bowed condition and the folded portion of the tongue element in folded superimposed condition;

Fig. 2, a view similar to that of Fig. 1 but directed toward the opposite side of the joinder, and illustrating the abutting, interlocked relationship between the tongue and slit elements;

Fig. 3, a vertical section taken on the line 3—3, Fig. 2;

Fig. 4, a horizontal section, considerably enlarged, taken on the line 4—4, Fig. 3;

Fig. 5, a detail perspective view of the tongue element per se of the joinder illustrated in Figs. 1 through 4;

Fig. 5A, a view similar to that of Fig. 5 but illustrating the slit element per se;

Fig. 6, a plan view of the sheet material blanked out for forming the tongue element of Fig. 5;

Fig. 7, a view corresponding to that of Fig. 2, but taken from a slightly different vantage point and enlarged;

Fig. 8, a plan view, looking from the inside, of another form of joinder pursuant to the invention, illustrating the abutting relationship between tongue element and slit element, and hidden parts by dotted lines;

Fig. 9, a similar plan view of the sheet material as blanked to form the tongue element of Fig. 8;

Fig. 10, a view similar to that of Fig. 8, but illustrating another form of joinder pursuant to the invention;

Fig. 11, a view similar to those of Figs. 8 and 10, but illustrating another form of joinder pursuant to the invention;

Fig. 12, a section taken on the line 12—12, Fig. 11 and illustrating the interengaged relationship of the folded and superimposed parts of the tongue element before insertion into the slit element;

Fig. 13, a view similar to those of Figs. 8, 10, and 11, but illustrating another form of joinder pursuant to the invention;

Fig. 14, a view similar to Fig. 9, but illustrating the sheet material blanked out to form the tongue element of the joinder of Fig. 13;

Fig. 15, an outside elevation of the corner of a folding box in which another form of joinder pursuant to the invention is in the process of being interlocked;

Fig. 16, a view corresponding to that of Fig. 15 but illustrating the joinder in completely interlocked position;

Fig. 17, a horizontal section taken on the line 17—17, Fig. 16;

Fig. 18, a plan view of the corner portion of the box blank utilized in forming the corner joinder of Figs. 15, 16, and 17.

Fig. 19, a view similar to those of Figs. 8, 10, 11, and 13, but illustrating still another form of joinder pursuant to the invention;

Fig. 20, an edgewise side elevation of the tongue element per se of the embodiment of Fig. 19;

Fig. 21, a plan view of the sheet material blanked to form the tongue element of Fig. 20;

Fig. 22, a view corresponding to those of Figs. 8, 10, 11, 13, and 19, and illustrating yet another form of joinder pursuant to the invention;

Fig. 23, a view corresponding to that of Fig. 5, being the tongue element per se, but illustrating different means for holding the tongue element in folded position;

Fig. 24, a perspective view, taken from above, illustrating a folding box having closure flaps locked tightly and securely by means of joinder pursuant to the invention;

Fig. 25, a fragmentary detail view illustrating how the tongue element of the folding box of Fig. 24 must be bent downwardly for insertion in its receiving slit;

Fig. 26, a view similar to that of Fig. 24 but illustrating another type of folding box having a closure tightly and securely locked by another form of joinder pursuant to the invention;

Fig. 27, a view corresponding, in general, to those of Figs. 8, 10, 11, 13, 19, and 22, but illustrating the form of joinder employed in the folding box of Fig. 26;

Fig. 28, a sectional view taken on the line 28—28, Fig. 27;

Fig. 29, a plan view of the sheet material as blanked out to form the tongue element of the joinder of Figs. 26, 27, and 28.

Fig. 30, a view corresponding to those of Figs. 24 and 26, but illustrating another type of folding box tightly and securely locked by means of a band of sheet material having tongue elements, pursuant to the invention, formed at its opposite ends, the same being interlocked with slit elements formed in the cover of the box, resulting in two joinders pursuant to the invention;

Fig. 31, an exploded view of another embodiment of joinder pursuant to the invention; and Fig. 32, a section taken on the line 32—32, Fig. 31, the parts being assembled pursuant to the invention.

Joinders formed according to the invention may be employed in a wide variety of instances where different sheet materials or where portions of the same sheet material are to be joined together. The elements utilized to form the joinder, and the manner in which they interengage and interlock, are outstanding so far as the present invention is concerned. There are, however, certain instances of use of such joinders, as here illustrated in Figs. 24 through 30, which give rise to advantageous folding box combinations possessing, in themselves, novel features.

In the folding box art, the sheet paper board material employed will normally possess the characteristics required for successful production of joinders pursuant to the invention. In other arts, the sheet materials should be considered in the light of the characteristics hereinbefore set forth.

The tongue-and-slit joinder of Figs. 1 through 7 is a preferred form of the invention in which the component parts of tongue element 10 are blanked out from sheet material 11, as shown in Fig. 6. The tongue element is formed by folding sheet part 10—1 upon sheet base part 10—2, on score line 12, to provide hinged double thickness, and to form a shoulder 13, see especially Fig. 5, extending transversely across the base part of the tongue element substantially coincident with the so-called base line 14. Such base line here represents merely the greatest width of the tongue element, and is indicated by a broken line.

The blanked portion of sheet material 10 is preferably cut as illustrated, Fig. 6, with broad V-shaped lateral sides, so as to provide the tongue element 10 with a tip 10a and a body portion which diverges gradually backwardly to preferably an abrupt termination laterally at the transverse edge portions 11a, 11a of the sheet material 10. Thus, the base line 14 will, in effect, rectilinearly connect such transverse edge portions 11a, 11a.

For providing means to retain the tongue element in its folded condition and to maintain the tongue-receiving slit or equivalent element in well bowed condition, a tab 15 is here included in the blanked portion of sheet material 11, extending substantially centrally from the free end edge of the folded part 11—2, that is, substantially centrally from the shoulder 13.

The slit element of this embodiment of the novel joinder here broadly disclosed, is shown per se in Fig. 5A, being indicated 17. It is rectilinear, and is forced through sheet material 18 at a convenient location within the zone of joinder. For cooperation with the tongue element 10, the slit element 17 has a length which is substantially equal to the length of the base line 14 of the tongue element.

The tongue element, as folded in the manner shown in Fig. 5, is pushed directly into the slit 17 until the shoulder 14 thereof "clicks" past that defining edge 17a of slit 17 which lies farthest from the tip 10a of the tongue element. At this point, the edge portions 10a, 10a, at either side of the base line 14 of the tongue element, will come into abutment with those portions of sheet material 18 which lie at either side of the terminal ends of the slit 17, thus preventing further entrance of the tongue element within the slit element and reinforcing the joinder, particularly against relative movement of the joined sheet materials side-wise of the joinder. It should be noted that, in this condition of the joinder, those portions of folded and superimposed part 10—2 of the tongue element which are not under the restrictive influence of retaining tab 15, namely, those portions at either side of the retaining tab 15 which form shoulder 13, resiliently flex or spring from the plane of base part 10—1 of the tongue element and increase the effective height of such shoulder 13, providing dual abutting contact of shoulder 13 with the defining edge 17a of slit 17, which is well bowed, substantially centrally of its length, by retaining tab 15. This dual abutting contact of shoulder 13 with defining edge 17a effects a very positive and secure interlocking of tongue element 10 with slit element 17, and a similar very positive and secure joinder of the sheet material 11 with the sheet material 18.

The joinder of Figs. 8 and 9 is essentially similar to that of the prior figures, the tongue element 20 being formed by folding the blanked end portion of sheet material 21 upon itself. Such blanked end portion comprises the tongue base part 20—1, and two similarly configurated parts 20—2, 20—2 extending from opposite lateral sides of such base part. In the forming of the tongue element, such parts 20—2, 20—2 are folded upon the base part 20—1 on the respective score lines 22, 22, and, as folded, overlap one another adjacent the tongue base line 23, providing the shoulder 24 for abutting engagement with that defining edge 25a of slit element 25 which lies farthest from the tip 20a of the tongue element. Such arrangement affords economy of material.

The slit element 25 is formed in sheet material 26 in the same manner as slit element 17 is formed in the sheet material 18 of the prior embodiment.

The folded and superimposed parts 20—2, 20—2 of the tongue element flex or spring from the plane of the base part 20—1, but are held at their tips by the respective retaining tabs 27, 27, which also maintain the defining edge 25a of the slit element in well bowed condition for dual abutting contact with the shoulder 24.

The embodiment of Fig. 10 is similar to that of Figs. 8 and 9, and like parts are indicated by corresponding reference characters, primed. The only difference between this embodiment and that of Figs. 8 and 9 resides in the substitution, for the retaining tabs 26, 26 of the latter, of a retaining tab member 28, which extends from the center of defining edge 25a' of the slit element. Such retaining tab 28 extends out over the folded, superimposed tongue parts 20—2', 20—2', and holds them in folded condition while maintaining the defining edge 25a' of the slit element in well-bowed condition. Thus, this embodiment achieves, by only a slight rearrangement of the parts, substantially the same results as the embodiment of Figs. 8 and 9.

The embodiment of Figs. 11 and 12 is identical with that of Fig. 10 with the exception that the overlapping tips, here designated 30, 30, of the folded and superimposed parts of the tongue element are provided with short edge slits 31, 31, respectively, which interengage adjacent the shoulder of the tongue element. Such slits 31, 31 have lengths well short of those lengths which would enable such folded and superimposed parts to lie flat in the plane of the base part of the tongue element when interengaged. Accordingly, such folded and superimposed tongue parts bulge from the plane of the base part, as shown in Fig. 12, by reason of their interengaged relationship, and, when the tongue element is inserted within the slit element, the retaining tab 28' presses the interengaged tips 30, 30, downwardly and reforms the large single bulge into two smaller bulges disposed at either side of such retaining tab, as indicated at 32, 32, Fig. 11.

In Figs. 13 and 14 is illustrated an embodiment of the invention which is structurally somewhat similar to the embodiment of Fig. 10, but functionally similar to the embodiment of Figs. 11 and 12. Here, the tongue element 35 is blanked out in sheet material 36, see Fig. 14, to provide a part 35—1, which is foldable on the score line 37 to superimposed position upon a base part 35—2, and wing flaps 35—3, 35—3 extending from opposite lateral sides of the part 35—1. In forming the tongue member 35 from the blanked material of Fig. 14, the parts 35—3, 35—3 are folded on their score lines 38, 38, respectively, to superimposed positions on the part 35—1. Thereupon, such part 35—1 is folded on its score line 37 to superimposed position on the base part 35—2, whereby the free end edge of part 35—1 provides a shoulder 39 raised from the plane of base part 35—2 by the resilient urge of the wing flaps 35—3, 35—3. Accordingly, when the tongue element 35 is inserted into the slit element 40, Fig. 13, the retaining tab 41, which extends centrally from that defining edge 40a of the slit 40 which lies farthest from the tip 35a of the tongue element, presses down the center of the superimposed tongue part 35—1 so that dual abutting contact of such slit defining edge 40a with the shoulder 39 of the tongue is had substantially as indicated at 42, 42. It will be seen that this embodiment is, therefore, closely related in function to the embodiment of Fig. 13.

In Figs. 15 through 18 is shown an application of an embodiment of the invention, which is generally similar to the embodiment of Figs. 1 through 7, to the securement of a corner of the tray of an ordinary type of folding box consisting of a tray and a telescoping cover, as in the usual suit box. Such box, except for its interlocked corner portions, is of ordinary construction, having a bottom panel 45 and intersecting end and side wall panels 46 and 47, respectively. To form the corner of such a box pursuant to the present invention, the corner panel is cut and scored to provide the tongue element 48 of the joinder, the slit element 49 being provided, in this instance, in the side panel 47.

The corner panel is so cut and scored, in the blanking out of the component parts of the tongue element, as to provide a part 48—1 foldable, on the score line 50, into superimposed position in the base part 48—2. As so blanked out, the corner panel also provides a reinforcing flap 51 for face-to-face contact with end wall panel 46, see Fig. 17.

The base part 48—2 of the tongue element provides a base line which is determined by the placement of the free end edge 52 of the part 48—1 when folded into superimposed position. Such base line is indicated 53 in Fig. 18. The remaining sheet material 54 of the corner panel, it should be noted, diverges from the base line 53 for limiting the extent of insertion of tongue element 48 in slit element 49, and for stabilizing the resulting joinder.

In this instance, the retaining tab 55 extends from one end of the edge or shoulder 52, instead of centrally thereof so as to provide maximum abutting edge at that side of tongue element when leverage is greatest. It serves to retain the tongue element in folded condition, as well as to maintain that defining edge 49a of the slit element, which lies farthest from the tip 48a of the tongue element, in bowed condition so shoulder 52 will have positive interlocking contact with such defining edge 49a. The resulting corner joinder is tight and strong.

Another form of joinder pursuant to the invention is illustrated in Figs. 19, 20, and 21. Here, the tongue element 60 is formed by double folding of the blanked out portion of sheet material 61, Fig. 21, upon itself. The part 60—1 is folded, on the score-cut line 62, into superimposed position on the part 60—2, and, thereafter, such part 60—2 is folded, on the score line 63, into superimposed position on the base part 60—3, the fold edge between parts 60—1 and 60—2 providing the shoulder 64 substantially coincident with the base line 65. The retaining tab 66, formed by the cut portion midway of the score-cut line 62, serves to hold the tongue element in folded condition, as well as to maintain that defining edge 67a of the slit element 67, which lies farthest from the tip 60a of the tongue element, in bowed condition for positive interlocking abutment against the shoulder portions 64, lying on either side of such retaining tab.

In Fig. 22 is illustrated how the joinder of Figs. 1 through 7 might be adapted to an instance where it is desired that the tongue element be allowed limited longitudinal movement with respect to the slit element. Corresponding parts are indicated correspondingly, with a prime added. It should be noted that the limiting edge portions 11a', 11a' converge in Fig. 24, to facilitate the interengaging and interlocking operation, a score line 80 is provided incident with the base line of tongue element 78, whereby such tongue element may be slightly bent, as illustrated in Fig. 25, just prior to its insertion in the slit element.

Unlocking of the closure is sufficiently difficult to discourage any ordinary unauthorized opening of the box, but may be effectively accomplished by sliding a flat blade under the closure panel 76, and into slit element 79 under that tongue part which provides the interlocking shoulder. The blade must be moved to extend under substantially the entire length of such shoulder, so as to press it into substantial coincidence with the plane of the tongue base part, whereby abutment against the opposite defining edge of the slit element is relieved and the tongue element can be easily disengaged from the slit element without damage to either.

Another type of box having a different embodiment of joinder, locking the closure thereof, is illustrated in Figs. 26 through 29. The closure is somewhat similar to the ordinary "tuck-in" types of closures, the tongue and slit elements of the joinder providing the "tuck-in" feature. This joinder is, however, tamper-proof. Any attempt to open the same will either destroy the box or leave a clearly visible trace of tampering.

The body portion 85 of the box may be of any desired formation presenting a front wall panel, as at 86, and a tuck-in type of closure, as at 87. The tuck-in flap 88 of the closure 87 is blanked out, as shown in Fig. 29, for folding to form the tongue element 89. The part 89—1 of the blanked out portion has wing flaps 89—2, 89—2 extending from opposite lateral sides thereof, which are folded upon such part 89—1, on the score lines 90, 90, respectively, in the forming of the tongue element. Thereafter, such part 89—1 is folded, on the score line 91, to superimposed position on the base part 89—3 so that the free end edge of such part 89—1 provides the shoulder 92. The outward urge of wing flaps 89—2, 89—2 raises part 89—1 out of the plane of base part 89—3, and, therewith, bows shoulder 92 into condition for positive interlocking with slit element 93, see especially Fig. 28.

The slit element 93 is formed through the upper end of front wall panel 86 for receiving and interlocking with tongue element 89. That defining edge 93a thereof which lies farthest from the tip 89a of the tongue element, abuts against shoulder 92 of the tongue element and interlocks therewith as in the prior embodiments. Here, portions of wing flaps 89—2, 89—2 project backwardly from the tongue element proper, see Fig. 27, and serve as retaining tabs for holding the tongue element in folded condition and for maintaining the defining edge 93a of the slit element in bowed condition.

Joinders of the invention may be applied as illustrated in Fig. 30, wherein a locking band substantially encircles a closed box and interlocks therewith at each of its opposite ends by means of joinders formed in accordance with the invention. The joinders may be of any of the types described hereinbefore, but, in instance where greatest resistance to unauthorized opening is desired, are preferably of the type illustrated in Figs. 26 through 29. As illustrated, the band 95 substantially encircles the closed box 96, the tongue elements 97 and 98, formed at the respective opposite ends of such band, interlocking with the slit elements 99 and 100, respectively, which are formed through the lid 96—1 of the box. Thus, the box 96 is tightly locked for handling and against unauthorized opening.

The more generic aspect of the invention is expressed in Figs. 31 and 32. Here, relatively stiff and relatively inflexible sheet material 105 is stamped or molded or otherwise shaped to form a tongue element 106 having a shoulder 107 formed adjacent its base line. Such shoulder is not rectilinear in this instance, although it is obvious that it may be made so. The V-shaped shoulder, directed toward the tip 106a of the tongue element, is indicative of what contours, other than rectilinear, might be given the shoulder in all embodiments of the invention. Under such circumstances, the slit element is configurated accordingly, as is indicated by the V-shaped slit element 108 formed through the relatively stiff but flexible and resilient sheet material 109, Fig. 31.

Related to this last embodiment is one which might be formed in accordance with the showing of Fig. 23, wherein the folded and superimposed part 70—1 of the tongue element is secured to the tongue base part 70—2 over the entire contacting area thereof by means of a suitable adhesive, such as glue, instead of by the wire staple 71, as illustrated.

From the foregoing, it will be apparent that the modus operandi of the variant types of joinder pursuant to the invention resides in the combination of a shoulder-provided tongue member with its therewith joined member, the latter having an effective edge, one of the members being provided with a tab, whereby upon joinder of the members the tab causes and maintains the effective edge in bowed status to effect engagement of the shoulder with the thus bowed effective edge and thus lock the members relative to one another.

Whereas this invention has been illustrated and described with respect to certain preferred specific embodiments thereof, it should be understood that various changes may be made in such specific embodiments, and various other specific embodiments may be constructed, by those skilled in the art without departing from the spirit and generic purview of the invention as set forth herein and in the claims that here follow.

We claim:

1. In a carton formed of relatively stiff paperboard, a part having a slit therein, another part having a tongue adapted to be inserted through said slit, said tongue having a folded-over part with a free transverse edge thereof serving as a transverse shoulder for abutting engagement with an edge of said slit, when the tongue is inserted through said slit in one direction, and a tab integral with said folded-over part and projecting from said free edge and through said slit in a direction opposite to said one direction and serving to bow said edge to effect such abutting engagement and thereby lock said first and second named parts relative to one another.

2. In the carton as defined by claim 1, wherein the tab which projects from the free edge of the tongue and is insertable in the slit is disposed symmetrically with respect to the ends of the slit.

3. In the carton as defined by claim 1, wherein the tongue of relatively stiff paper board is folded over upon itself at its opposite lateral free end portions, thereby forming the free transverse edge of the tongue and simultaneously therewith a plurality of tabs integral with said folded-over end portions, which tabs project from such free edge.

4. In the carton as defined by claim 1, wherein the tongue of relatively stiff paper board is folded over upon itself at its opposite lateral free end portions, thereby forming the free transverse edge of the tongue and simultaneously therewith a plurality of tabs integral with said folded-over end portions, which tabs project from such free edge and are disposed symmetrically with respect to the ends of the slit.

WILLIAM A. RINGLER.
MARSHALL I. WILLIAMSON.